United States Patent [19]
Zerbola

[11] 3,860,301
[45] Jan. 14, 1975

[54] ROLLING BEARING WITH SHEET METAL RINGS AND TWO ROWS OF ROLLING BODIES

[75] Inventor: Giorgio Zerbola, Torino, Italy

[73] Assignee: SKF Industrial Trading and Development Company B.V., Amsterdam, Netherlands

[22] Filed: May 31, 1973

[21] Appl. No.: 365,667

[30] Foreign Application Priority Data
July 6, 1972  Italy .................................. 69171/72

[52] U.S. Cl. .............................................. 308/183
[51] Int. Cl. ........................................... F16c 19/00
[58] Field of Search ............................ 308/183, 191

[56] References Cited
UNITED STATES PATENTS
2,617,668  11/1952  Stewart.............................. 308/183

Primary Examiner—M. Henson Wood, Jr.
Assistant Examiner—Richard A. Bertsch
Attorney, Agent, or Firm—Ladas, Parry, Van Gehr, Goldsmith & Deschamps

[57] ABSTRACT

A rolling bearing comprising two coaxial elements rotatable one with respect to the other by way of two rows of rolling bodies which roll in rolling races in these elements is described. The rolling bodies of one row are located at an axial distance from the rolling bodies of the other row of greater than 20 percent of the diameter of one rolling body; a first of said two rotatable elements consists of two rings of sheet metal joined together on each of which is formed a rolling race for said rolling bodies, and the second of said two rotatable elements is formed from a single ring of sheet metal on which the other two rolling races for said rolling bodies are formed, one of said other two rolling races of the second rotatable element being formed on an annular part of the second element which is bent over on the inside of the element.

4 Claims, 6 Drawing Figures

PATENTED JAN 14 1975

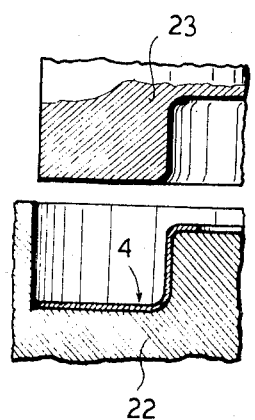
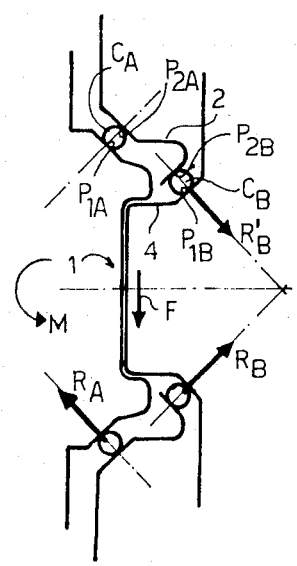
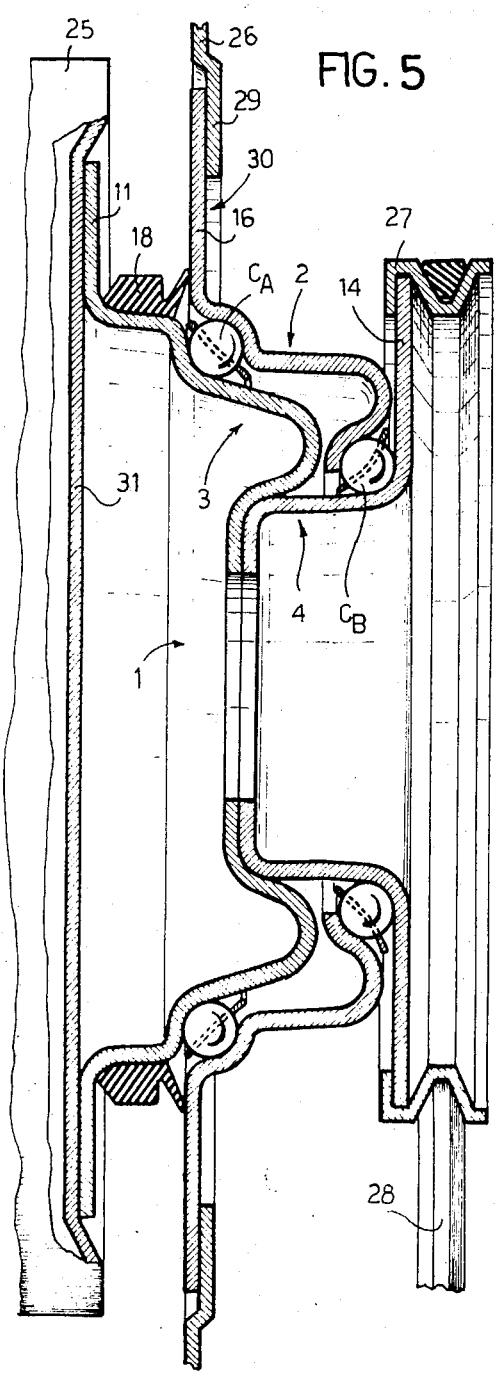

ROLLING BEARING WITH SHEET METAL RINGS AND TWO ROWS OF ROLLING BODIES

CROSS REFERENCE TO RELATED APPLICATION

Applicant claims priority from corresponding Italian Pat. application Ser. No. 69171-A/72 filed July 6, 1972.

BACKGROUND OF THE INVENTION

This invention relates to a rolling bearing with sheet metal rings and two rows of rolling bodies, adapted for operating with a system of loads comprising radial forces, axial forces and moments, of simple construction and with high load capacity.

Rolling bearings are known which comprise sheet metal rings between which two rows of rolling bodies are disposed and which are suitable for supporting radial forces, axial forces in both directions and moments. In these bearings, the capacity to resist the aforementioned loads is obtained by configuring the rolling races for the rolling bodies in such a manner that the normals at the points of contact of each of said races with the relative rolling bodies pertain to the same conical surface the vertex of which is situated on the other side of the vertex of the other conical surface with respect to a plane normal to the axis of the bearing. In bearings of the described type, the axial distance between the rolling bodies of the two rows is normally greater than 20 percent of the diameter of a rolling body.

In bearings of the type described, each ring is normally constructed by plastic deformation of a semifinished tubular product, so as to form in it a pair of annular grooves arranged to constitute the rolling races for the rolling bodies. In an alternative process, these annular grooves are formed simultaneously on both said semifinished products by first disposing the rolling bodies of the rows between these semifinished products and then deforming them in order to obtain the grooves.

Bearings of the type described give rise to certain disadvantages. When the bearing is constructed according to the first described process, the precision of the rolling races and the load capacity of the bearing are not very high. In fact, because of the presence on each ring of two annular grooves, the profile of a section through the ring taken on a diametrical plane of the ring is intersected at more than one point by a straight line parallel to the axis of the ring. From this geometrical condition, it follows that neither ring can be constructed by plastic deformation operations with dies comprising a single matrix and a single male both in a single piece, with the second axially movable with respect to the first. In fact the annular grooves, projecting radially with respect to the central part of each ring, constitute undercuts which prevent extraction of the ring either from the matrix, or from the male. Consequently, for constructing each ring at least one die must normally be used in which the matrix or male or both are in two or more parts, each of which is mobile radially with respect to the others. As these parts wear easily because of the relative movements between them, and do not return to their initial position if foreign substances have infiltrated between them (shavings or dust), the precision with which said rings are obtainable is obviously low.

Furthermore, the load capacity of the bearings constructed by the first of the two aforementioned processes is rather low, as a condition of complete filling cannot be obtained in them, i.e. in which the annular grooves between the two rings are completely or nearly completely filled with rolling bodies. In fact, as the bodies are introduced between the rings only after the annular grooves have been made, the stated condition can obviously not be obtained.

Although this latter disadvantage is eliminated in bearings obtained by the second of the stated processes the precision of the rolling races is still low as they are obtained by the rolling bodies being used to plastically deform the said ring elements.

SUMMARY OF THE INVENTION

The object of the invention is to provide a rolling bearing comprising:

a first and a second coaxial element rotatable one with respect to the other and provided with rolling races;

two rows of rolling bodies which roll in said rolling races, the rolling bodies of one row being located at an axial distance from the rolling bodies of the other row of greater than 20 percent of the diameter of one rolling body of the rows and the normals at the points of contact of each of the rolling races with the relative rolling bodies pertaining to one conical surface the vertex of which is located on the opposite side of the vertex of the other conical surface with respect to a plane normal to the axis of the bearing;

said first rotatable element consisting of two rings of sheet metal joined together on each of which is formed a rolling race for said rolling bodies;

said second rotatable element being formed from a single ring of sheet metal on which two rolling races for said rolling bodies are formed and one of said two rolling races of the second rotatable element being formed on an annular part of the second element which is bent over on the inside of the element.

BRIEF DESCRIPTION OF THE DRAWINGS

For a better understanding of the present invention, a description of one embodiment will now be given by way of example, with reference to the accompanying drawings in which:

FIGS. 2, 3 and 4 are partial diagrammatic sectional views of dies used for drawing parts which make up the bearing of FIG. 1;

FIG. 5 is a vertical section through a part of a mechanical unit in which the rolling bearing of FIG. 1 is used;

FIG. 6 is a diagrammatic representation of the rolling bearing of FIG. 1 which shows a load condition and the reactions exchanged between rolling bodies and rolling races of the bearing as produced by the loads applied to the bearing.

DETAILED DESCRIPTION OF THE INVENTION

Figure 1:
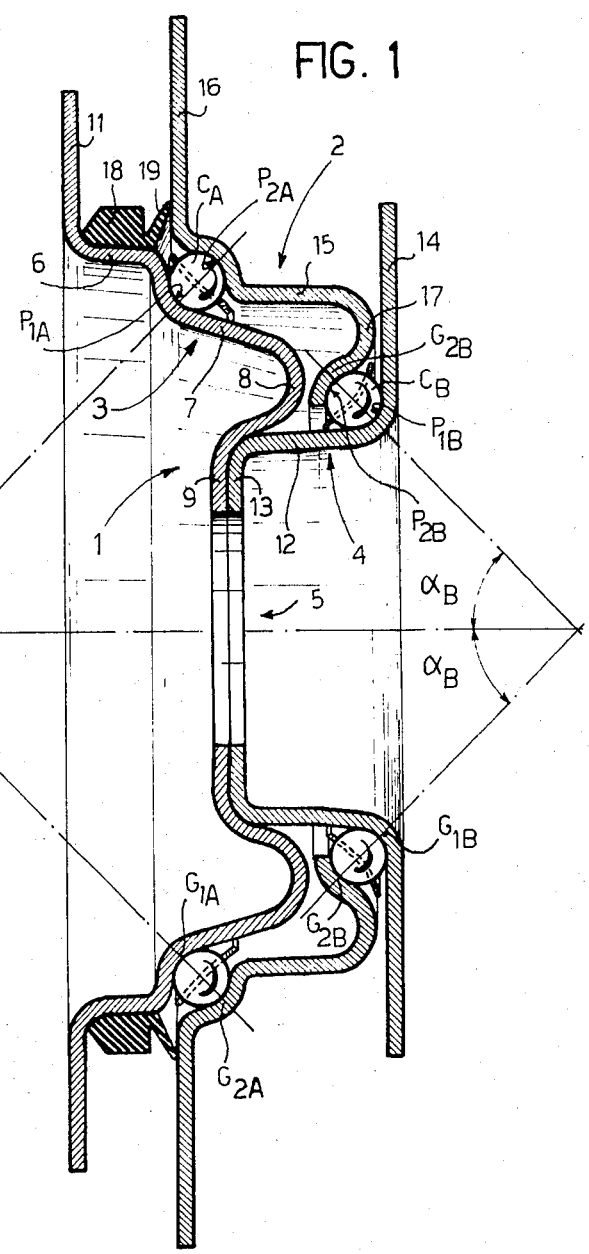
FIG. 1 is a vertical section through a rolling bearing according to the present invention.

With reference to FIG. 1, the rolling bearing of the invention comprises substantially an internal rotatable element indicated overall by the reference numeral 1 and an external rotatable element 2 coaxial to the former, on which rolling races are formed for rolling bodies, consisting in the case of the embodiment shown in FIG. 1 of spheres, pertaining to two rows of speres indicated by $C_A$ and $C_B$.

The internal element 1 consists of two rings 3 and 4, each provided with an internal hose 5. Said hole may also be absent, the rings 3 and 4 in this case assuming the form of actual discs.

Two rolling races $P_{1A}$, $P_{1B}$, are formed on the element 1, the first on the ring 3 and the second on the ring 4, arranged so as to constitute rolling seats for the spheres of the rows $C_A$ and $C_B$ respectively. On the external element 2 rolling races $P_{2A}$, $P_{2B}$ are formed constituting rolling seats for the spheres of the rows $C_A$ and $C_B$ respectively.

The diametrical profile of the surfaces of the rolling races $P_{1A}$, $P_{2A}$ is such that the normals to these surfaces passing through the points of contact between the spheres and surfaces pertain to the same conical surface the axis of which coincides with the axis of the bearing and having a semiangle equal to $\alpha_A$. Likewise, the profile of the surfaces of the rolling races $P_{1B}$, $P_{2B}$, is such that the normals to these surfaces passing through the points of contact between the spheres and surfaces pertain to the same conical surface the axis of which coincides with the axis of the bearing and which has a semiangle of $\alpha_B$. Conveniently, as is usual for races of telling bearings, each of the surfaces of said races has as its generating line a circumferential arc. The vertices of the conical surfaces firstly defined are on opposite sides of the plane which contains the centres of the spheres of the corresponding rows $C_A$ and $C_B$. Although the angles $\alpha_A$ and $\alpha_B$ may have any value and may be different one from the other, for the reasons which will be explained hereinafter it is convenient to choose $\alpha_A = \alpha_B = 45°$.

The rings 3 and 4 of the inner element 1 and outer element 2 may be constructed of sheet metal by plastic deformation of the sheet metal using techniques known to the art. The ring 3 of the inner element 1 comprises substantially two parts, a cylindrical part 6 and conical part 7, between which there is an annular groove $G_{1A}$, attained by plastic deformation of the sheet metal. The conical part 7 is followed firstly by a curved part 8 and then by a ring part 9; the ring 3 is provided with a flanged part 11.

The ring 4 of the inner element 1 substantially comprises a cylindrical part 12, a ring part 13 and a flanged part 14. Between these latter two parts there is an annular groove $G_{1B}$, obtained by plastic deformation of the sheet metal.

The outer element 2 comprises substantially a cylindrical part 15 and a flanged part 16 between which is formed an annular groove $G_{2A}$ by plastic deformation of the sheet metal. An annular groove $G_{2B}$ forms part of this ring, and is located internal to the cylindrical part 15 and connected to it by a curved part 17. The annular groove $G_{2B}$ is obtained by bending the sheet metal of the ring 2 inside the cylindrical part 15.

Conveniently, on the cylindrical part 6 of the ring 3 of the inner element 1 there is a rubber ring 18 provided with an annular lip 19 arranged for resting on the flanged part 16 of the outer element 2.

The rings 3 and 4 of the inner element 1 and of the outer element 2 form a rolling bearing with two rotating concentric elements and the pairs of rolling races $P_{1A}$, $P_{2A}$ and $P_{1B}$, $P_{2B}$ of which have different diameters and comprise the aforementioned geometrical characteristics. In particular, the rings and element can be constructed with considerable precision using simple equipment, of low cost and reliable operation.

In order to understand the stated advantages connected with the process for manufacturing the bearing, the main stages of the process will be examined. The outer element 2 and each ring 3 and 4 are obtained from a semifinished sheet metal product formed by a blanking operation, and then drawn in one or more operations using one or more drawing dies. Each drawing die comprises substantially a matrix and male in a single piece which, when the die is closed, define a cavity of substantially the form of the item which is to be drawn to the die.

Figure 2:
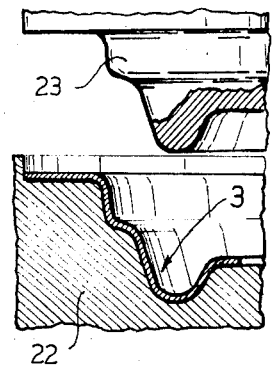
Figure 3:
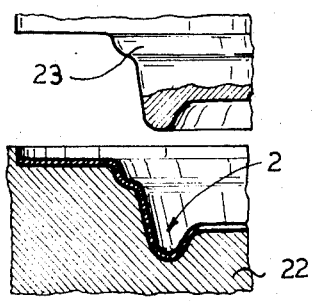

FIGS. 2, 3 and 4 show partial diagrammatic sections of such a die suitable for producing the rings 3 and 4 and the outer element 2. This die comprises substantially an annular matrix 22 and a male 23 between which is the relative item (ring or element) at the end of the drawing operation. As can be seen from these figures, it is possible to generate with each of said moulds an article of final shape equal to that of the outer element 2 (FIG. 3) or of the rings 3 and 4 (FIG. 2 and 4), which may be easily extracted from the die as it does not comprise undercuts which oppose the opening of the die. As is known, the term "undercut" signifies a part of the article which projects in a direction radial to the direction of opening of the die and therefore opposes the opening of the die. The absence of undercuts in the outer element 2 and rings 3 and 4 derives from the fact that each of them is configured in such a manner that the profile which it has in a diametrical plane is intersected at only one point by a straight line parallel to the axis of the element or ring.

Consequently, on the basis of the description, the outer element 2 and rings 3 and 4, as they are constructed in a die of the type described, are produced at low cost as these dies are very simple and of reliable operation, and with a high precision as the parts (matrix 22 and male 23) of the die are constructed in a very precise manner and do not give rise to much wear during their use. The rings of known sheet metal bearings of this type, because of the presence of undercuts, must instead be manufactured with dies whose matrix and male are constructed in a number of parts which are mobile one with respect to the others; in this case, because of wear of these parts or infiltration of foreign substances between them, rings are obtained which are of low precision.

The part 9 of the ring 3 and the part 13 of the ring 4 are in contact and are fixed one to the other in any convenient manner, for example by welding, riveting or the like. Each of the flanges 11, 14 and 16 may be arranged for fixing in any convenient manner to parts or members of the mechanical device in which the revolving bearing of the invention is to be used. For this purpose, holes may be formed in said parts or any other known fixing means may be associated with them.

As the assembly of the spheres of the rows $C_A$ and $C_B$ may be made before the ring 3 is fixed to the ring 4, it is evident that the number of spheres in these rows may be very high, corresponding to the so-called completely filled condition in which the spheres are tangential or almost tangential one to the other.

FIG. 5 shows an example of utilisation of revolving bearing of the invention. In this constructional disposition, the bearing supports a rotation member 25 which is mounted in a cantilevered manner with respect to a wall 26 of a mechanical unit. The stated condition (cantilevered assembly of a rotating member) is met with in certain household electric mechines, for example in washing machines, in which the rotating member 25 consists of the washing machine drum.

In order to form this constructional arrangement, a pulley 27 is fixed to the flange 14 in any convenient manner, for example by welding, and in the case illustrated this is arranged for use with a V belt 28 and is constructed of sheet metal. The flange 16 of the outer element 2 is connected in any convenient manner, for example by bolts (not shown), to the edge 29 of a hole 30 formed in the wall 26. The rotating member 25, in particular the drum of the washing machine, is fixed to the flange 11 by connecting this latter for example to a bottom wall 31 with which said member is provided.

The assembly and method of operation of the revolving bearing according to the invention are as follows.

The flange 16 of the outer element 2 is normally fixed to a fixed part of the mechanical unit on which the bearing is to be mounted, for example in the case of the constructional disposition shown in FIG. 5, to the wall 26. Two different rotating members, for example the member 25 and pulley 27, may be fixed however to the flanges 11 and 14. When one of the two elements 1 or 2 is made to rotate, for example by the V belt 28 wound on the pulley 27, there is relative rotation of one element with respect to the other and consequent rolling of the spheres of the rows $C_A$ and $C_B$ on the corresponding races $P_{1A}$, $P_{2A}$, $P_{1B}$ and $P_{2B}$.

The revolving bearing of the invention is able to support radial forces in both directions, pure moments and load systems obtained by the combination of radial forces and moments.

FIG. 6 shows a load system (forces and moments) applied to the bearing. It is supposed that this system of forces gives rise to a resultant radial force F and a resultant moment M acting for simplicity in the same plane as the load F. If it is also supposed that only the spheres included in the diametrical plane which contains said force and moment react to this load system, then there are substantially three reactions $R_A$, $R_B$ and $R'_B$, normal to the coupled sphere-race surfaces. It is obvious that the system of said reactions is able to balance the load system consisting of the force F and moment M. Even though only the load condition shown in FIG. 6 has been examined by way of example, it is evident that the bearing according to the invention is able to resist radial forces in both directions, pure moments and a load system consisting of radial forces and pure moments.

It is also evident that in order to increase the load capacity of the bearing according to the invention to radial forces (force F) it is necessary to choose small angles $\alpha_A$ and $\alpha_B$, whereas to increase the load capacity to moments (moments M) it is necessary to choose large angles $\alpha_A$ and $\alpha_B$. A good load capacity for load systems consisting of radial forces and moments is obtained by choosing $\alpha_A = \alpha_B = 45°$, which can be considered the preferred condition for the bearing according to the invention.

Although in the illustrated and described embodiments of the invention the rolling bodies consist of spheres, it is evident that a bearing may be constructed according to the same inventive concept using rolling bodies of different shape, for example rollers. Moreover the rings 3 and 4 of the inner element 1, instead of comprising the central hole 5, may be without this hole so as to give rise to actual discs joined one to the other.

What we claim is:

1. A rolling bearing comprising:
   a first and a second coaxial element rotatable one with respect to the other and provided with rolling races;
   two rows of rolling bodies which roll in said rolling races, the rolling bodies of one row being located at an axial distance from the rolling bodies of the other row of greater than 20 percent of the diameter of one rolling body of the rows and the normals at the points of contact of each of the rolling races with the relative rolling bodies pertaining to one conical surface the vertex of which is located on the opposite side of the vertex of the other conical surface with respect to a plane normal to the axis of the bearing;
   said first rotatable element consisting of two rings of sheet metal joined together on each of which is formed a rolling race for said rolling bodies;
   said second rotatable element being formed from a single ring of sheet metal on which two rolling races for said rolling bodies are formed, and one of said two rolling races of the second rotatable element being formed on an annular part of the second element which is bent inside of a central substantially cylindrical part of the element.

2. A rolling bearing as claimed in claim 1, wherein said central substantially cylindrical part, and a flanged part orthogonal to said cylindrical part and said annular part, said annular part defining, with said central cylindrical part, an annular cavity internal to the second rotatable element, the other of said two races of the second rotatable element being formed between said central cylindrical part and said flanged part and the second rotatable element being configured in such a manner that its profile in a section taken on a diametrical plane of said element is intersected at only one point by a straight line parallel to the axis of the element.

3. A rolling bearing as claimed in claim 1, wherein each of said two rings of the first rotatable element comprises a flanged part orthogonal to the axis of the element, each of said rings being configured in such a manner that its profile in a section taken on a diametrical plane of said ring is intersected at only one point by a straight line parallel to the axis of the ring.

4. A rolling bearing as claimed in claim 1, wherein one of said rings of the first rotatable element is provided with a substantially cylindrical part on which a ring of soft material is mounted provided with an annular lip arranged to rest on the flanged part of said second element.

* * * * *